Sept. 20, 1932. P. MEHRER 1,877,930
TANDEM MULTIPLE SUPPORTING, DRIVING, AND BRAKING MECHANISM
Filed Feb. 12, 1930 2 Sheets-Sheet 2
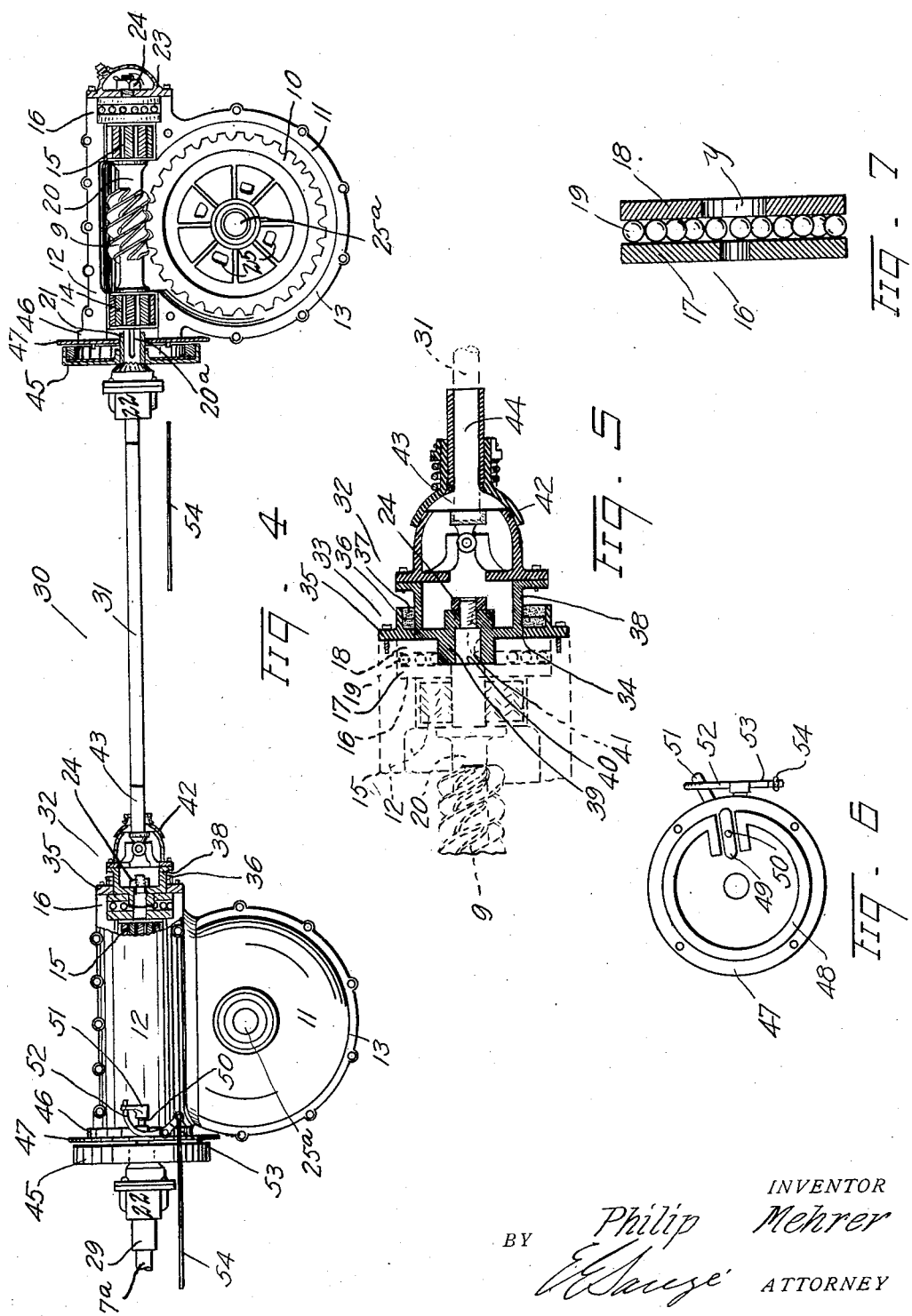
INVENTOR
Philip Mehrer
BY
ATTORNEY Patented Sept. 20, 1932

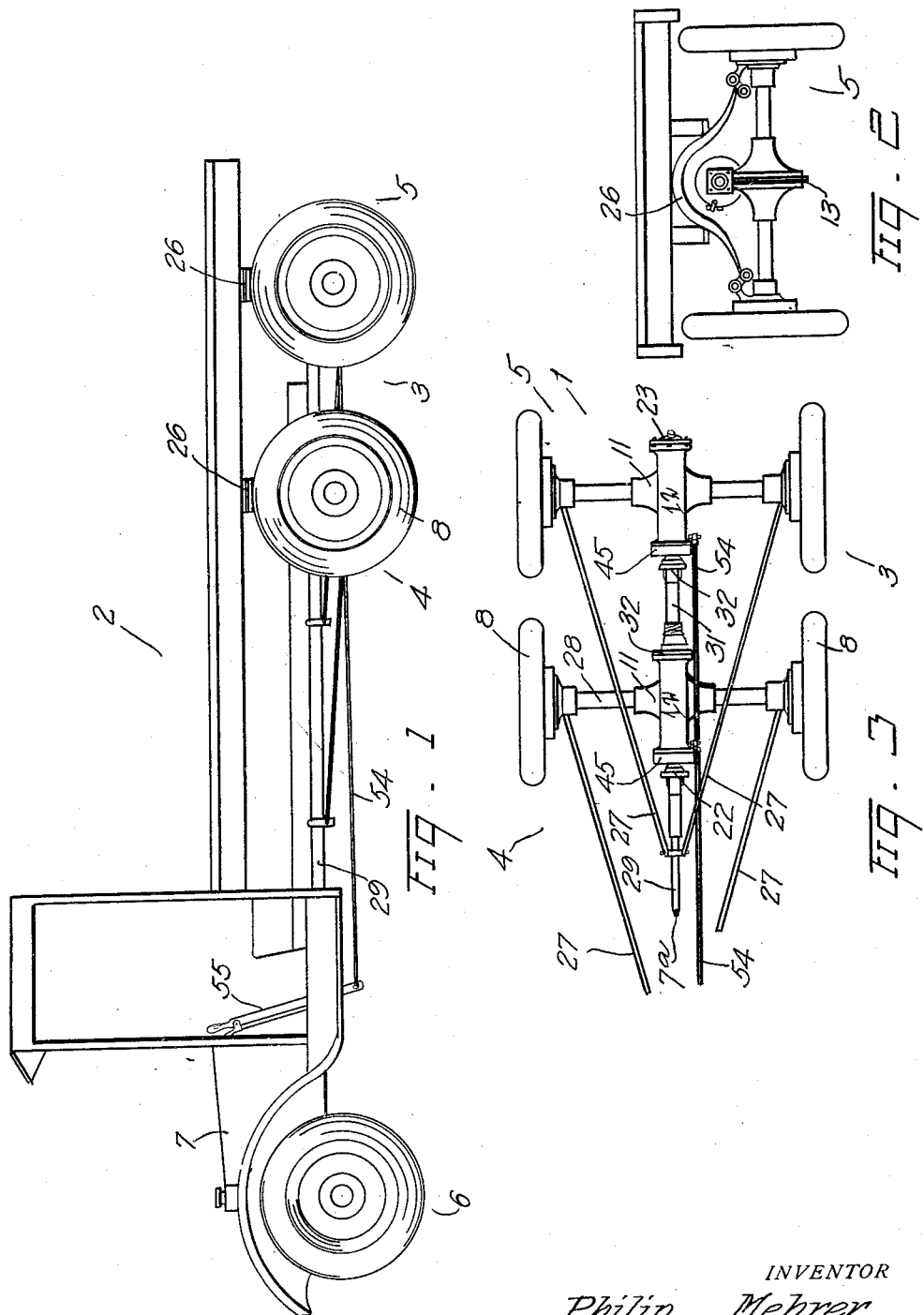

1,877,930

UNITED STATES PATENT OFFICE

PHILIP MEHRER, OF TOPPENISH, WASHINGTON

TANDEM MULTIPLE SUPPORTING, DRIVING, AND BRAKING MECHANISM

Application filed February 12, 1930. Serial No. 427,819.

This invention relates to automotive rear drive and braking devices, and has as one of its objects to provide a device that will convert an automotive vehicle from a light to a heavy duty vehicle, or conversely.

Another object of the invention is to provide an automotive rear drive and braking device.

A further object of the invention is to provide a device that may be added to a present two wheeled rear end driving mechanism to provide an interlocked four wheeled driving system and divide the wear and strain in two.

A further object of the invention is to provide a device that will provide for additional support under a load and that will permit a rearward extension of the body of the vehicle, (as in busses), to accommodate the additional load.

A further object of the invention is to provide a device that is adapted to be controlled by a simple braking system applicable to control all four wheels simultaneously by attachment to either pair of wheels, and that may be operated by the standard foot or emergency levers, or by an independent lever for the purpose.

A further object of the invention is to provide a device that will provide easier riding qualities and less vibration by preventing rocking on rough ground.

With these and other objects in view, reference is now had to the accompanying drawings in which Fig. 1 is a side elevation of a truck showing the position of the added drive wheels;

Fig. 2 is a rear elevation showing means of attachment to a truck bed;

Fig. 3 is a plan view of the rear drive and braking apparatus;

Fig. 4 is a side elevation of the drive, assembled, with parts broken away, removed, and in section;

Fig. 5 is a vertical sectional view, enlarged, showing the connecting mechanism attached;

Fig. 6 is a front elevation, enlarged, of the brake plate, and

Fig. 7 is a sectional elevation of the thrust bearing remodeled.

Having reference to the drawings like numerals refer to like parts throughout the several views and the numeral 1 refers to a tandem multiple supporting, driving and braking mechanism which consists of an automotive vehicle 2 shown in the accompanying drawings as a truck, and a compound supporting structure 3 consisting of the original drive wheels and their operating mechanism 4 and a like structure 5 consisting of like wheels and like operating mechanism, and the truck is provided with a front vehicular support 6 in the nature of steering wheels, with the compound structure 3 forming the rear vehicular support of said truck.

While a truck is represented it must be understood that any power driven vehicle may be utilized that will demand an elongated body or a maximum of supporting structure, such as a passenger bus, a logging truck, or vehicle of like requirements, and it must be further understood that while the truck is represented with its compound structure 3 positioned in the usual manner, at the rear end of the truck, that any positioning of the wheels may be utilized without departing from the spirit of the invention, as for instance, were the driving wheels of the structure shown as positioned at the front of the truck and arranged for steering purposes and in addition another driving structure were positioned as shown, thus to provide a truck having an elongated bed at each end with the cab or controlling part of the truck centrally positioned or in other arrangements requiring substantial support and driving means for enormously heavy loads.

Obviously a motor vehicle of this description will require a power source, which power source may be represented as resting under the hood 7, shown, and this power source is not shown as it is old in the art and as it is not a part of the invention proper.

From the power source the usual drive shaft 7a, connected therewith, extends rearward and is connected with the original supporting structure 4, in the usual manner of such connection and this supporting structure as above mentioned includes the driving wheels 8 which are differentially connected, the whose assembly being in the usual manner of such construction. The drive shaft connects centrally with the differentially mounted driving wheels, and the power is intended to be communicated to the driving wheels by means of a worm 9 and worm wheel 10 mounted in a differential housing 11 consisting of a worm barrel 12 and a worm gear housing 13 formed integral and in two halves, the worm barrel containing a front roller bearing 14 and a rear roller bearing 15, with a thrust bearing 16 mounted at the rear end thereof and consisting of a front bearing plate 17 and a rear bearing plate 18 and these plates being separated by balls 19 in the usual manner of construction of such thrust bearings.

Mounted in the roller bearings and passing through the thrust bearing is a short worm shaft 20, upon which a worm 9 is constructed as an integral part, with the front end of the shaft 20a splined to slidingly connect with a sleeve 21 terminating forwardly in a universal joint 22 which in turn receives the drive shaft 7a for suitable connection with and operation of the said worm shaft.

Closing the rear end of the worm barrel 12 is a cap 23 and the worm shaft projects through this cap and is provided on its end with a securing nut 24 which when the cap is attached to the worm barrel by means of its bolts or cap screws, will maintain the assembled parts in proper relation with each other.

The worm gear contains the differential mechanism 25 within itself in the usual manner of such construction, and this mechanism is indicated herein by the four rather rectangular lines shown between the spokes of this gear, see Fig. 4, and the axle 25a, the end of which as shown in this figure obviously is mounted centrally within this differential mechanism.

As this invention lies in the fact that by the addition of a supplemental supporting structure a greater support will be provided, and by their tandem relation making it possible to elongate the bed of the truck, a like supporting structure 5 is added to complete the invention, and this like added structure will be of identical assembly with that of the original structure 4 with the addition of certain changes in both structures whereby the two structures may be operably joined together, which changes also constitute its part of the invention, all of which will be presently explained.

This like supporting structure 5 is secured to the vehicle in a like manner to that of the original supporting structure i. e. by means of a spring 26, and preferably as shown in Fig. 2, and while the original supporting structure is braced by radius rods 27 the supplemental like supporting structure is also provided with radius rods 27 which latter rods are disposed to pass the axle housing 28 of the original structure as the line of the drive shaft is positioned above the line of the axle housing permitting these rods to pass thereover, in assembly, and for the purpose of securement to the torque tube 29 the rods will be passed beneath the forward spring which supports the original structure, and both pairs of radius rods are secured to the torque tube in a like manner.

While this construction utilizes the torque tube to maintain the drive wheels in their proper tandem position, obviously other means of support and attachment may be used if deemed advisable, the purpose being to maintain the compound supporting structure formed thereby in true tandem relation irrespective of whether two or a multiplicity of pairs of drive wheels are used.

For the purpose of driving the compound structure as a unit a connecting mechanism 30, including a connecting shaft 31, is adapted to connect the various pairs of differentially connected driving wheels together wherewith to provide a multiple wheeled drive that will interlock all of the wheels for action as a unit, and to provide this means and adapt it to the standard assembly it must join with the two worm shafts thus forming a connection which will now be explained.

This connection is therefore to adapt the standard differential housing to receive the connecting shaft (or shafts) whereby to provide an operable connection that will rotate in unison with the drive shaft, and through the preceding worm barrels.

For this purpose a dust proof bearing cap 32 is substituted for the original end cap 23 and consists of a flange 33 extended inward to provide a bearing 34, for a purpose to be explained, and extended outward to provide a coupling flange 35, the latter flange having the same dimensions as the original cap whereby to permit securement in its stead on the rear end of the worm barrel.

This bearing cap is also provided with a packing gland 36 and contains packing rings 37 having an inner surface equal with the said bearing, and mounted in the bearing and the packing rings is a connecting piece 38, formed of a general cup shape, and provided with an offset sleeve 39 in the bottom of the cup, having the bottom edge of the cup finished to journal in the said bearing, and having its sides extended rearward and flanged, for a purpose to be explained.

The rear end of the worm shaft is reduced in diameter and provides a shoulder 40 thereon which comes within the boundary of the thrust bearing, and a further reduction provides a threaded stem that is originally passed through the said end cap 23 to receive the nut 24 and for the purpose of coupling the worm shaft and the connecting piece together rigidly and securely Woodruff keys 41 are fitted to each of the reduced portions and a key seat cut in the said offset sleeve, the two parts then being forcibly united and finally secured by the nut 24 as shown in Fig. 5.

To complete this assembly a universal joint 42 is bolted, or otherwise secured, to the flange of the rearwardly extending side and this joint contains a splined sleeve 43 wherewith to slidably engage a correspondingly splined end 44 of the connecting shaft.

For the purpose of entering the worm barrel a sufficient distance for firm securement, a distance governed by the offset on the worm shaft, the original rear plate of the thrust bearing has its central orifice enlarged as at Y, see Fig. 7, to receive the offset sleeve which is driven up to the aforementioned shoulder 40.

The other end of this connecting shaft is similarly mounted in a second universal joint 22 connected with the like structure, and this universal joint is also provided with the usual splined sleeve 21 the latter sleeve fitting the forward end of the worm shaft 20 to rotate that member by means of its splined end, whereby and with the two structures joined together, a compound structure is provided.

The sleeve 21 of the forward universal joint 22 provides a circular and rotating member upon which may be mounted a brake drum 45 and the forward flange 46 of the worm barrel 12 is adapted to have secured thereto a plate 47 of substantial material which plate carries the brake shoe 48 and its expanding mechanism, the latter consisting of a cam 49 mounted in said plate and positioned between the ends of the brake shoe and this cam is provided with a stub shaft 50 that is extended through the plate there to receive a lever arm 51 on its rearwardly projecting end securely attached thereto.

A second lever 52 is likewise carried by the plate and is provided with a curved arm to engage the lever 51 of the cam and this lever 52 is provided with a downwardly positioned lever 53 to which a forwardly extended brake rod 54 is secured and then connected with a brake operating lever 55 located convenient to the operator.

By this means there is provided a supporting structure that will permit of an extended bed which in turn permits of a greater distribution of the load; giving increased capacity; double traction or traction commensurate with the length of the bed; and a positive braking means adapted to control each unit of the compound supporting means affording greater protection during the operation of the device.

While this device is applicable to worm driven vehicles the wear and strain thereon will be divided and this also applies to the tires of the driving wheels on account of the fact that should one tire become flat there will be a side drag that will cause an instantaneous and very noticeable effect upon the power source.

With the wheels of this compound supporting mechanism so arranged, there will be obviously less vibration and easier riding qualities as rocking on uneven ground will be prevented, and a truck of certain tonnage may be converted to a truck of greater tonnage at a minimum of expense by the change above mentioned in the rear end of the front supporting structure and further the side slip on curves due to this arrangement is found to be practically of no moment under actual test.

In use the rear plate 18 of the thrust bearing 16 is removed and the orifice 55 therein is enlarged to receive the offset sleeve and the plate replaced, the connecting piece 38 is then secured thereon by the above mentioned keys and the whole locked together by the nut 24.

The brakes are then mounted on the sleeves 21 of the respective universal joints 22 and the radius rods 27 duly connected and the brake rods 54 connected to the brake operating lever 55 and the spring 26 of the supplemental supporting structure secured to the bed, when the device is ready for operation.

The terms "forward" and "rear" as used have reference to the respective parts positioned as shown on the drawings, these obviously will be reversed should they be applied to like parts mounted at the front end of the truck.

Having thus described my invention, I claim,

In a tandem multiple supporting, driving and braking mechanism, the combination of a plurality of supporting structures arranged in tandem, and having a driving shaft associated therewith, and comprising a front structure adapted to engage the driving shaft at its front end, a brake structure mounted thereon, and a rear supporting structure identical with the front structure, and provided with a like brake structure, means to operate said brakes simultaneously, a connecting shaft engageable with said rear supporting structure in like manner and in lieu of said driving shaft, said structures, each including a worm barrel provided with bearings in each end thereof and containing a worm mounted on a worm shaft extended at both ends and mounted in said bearings, the rear extension of said shaft having a shoulder, a thrust bearing disposed to engage said shoulder, and a rear end cap removably attached to and closing said rear supporting structure barrel, and a connecting mechanism adapted to progressively and operatively unite said structures and consisting of a dust proof bearing cap attachable to the front supporting structure barrel, and comprising a coupling flange provided with a bearing formed therein and having a packing gland, a connecting piece journalled in said bearing and provided with an offset sleeve rigidly secured to and rotatable with said worm shaft, in said bearing, and a universal coupling joint attached to and rotatable with the connecting piece, and provided with a splined sleeve disposed and adapted to receive the front end of said connecting shaft.

In testimony whereof I have affixed my signature.

PHILIP MEHRER.